United States Patent
Wiryaman et al.

(10) Patent No.: US 7,149,222 B2
(45) Date of Patent: Dec. 12, 2006

(54) INTEGRATED ACCESS POINT NETWORK DEVICE

(75) Inventors: Santa Wiryaman, Lexington, MA (US); Vladimir Sukonnik, Dover, MA (US); David Romrell, Hillsboro, OR (US)

(73) Assignee: Converged Access, Inc., Littleton, MA (US)

( * ) Notice: Subject to any disclaimer, the term of this patent is extended or adjusted under 35 U.S.C. 154(b) by 543 days.

(21) Appl. No.: 09/730,513

(22) Filed: Dec. 5, 2000

(65) Prior Publication Data

US 2001/0030970 A1    Oct. 18, 2001

Related U.S. Application Data

(60) Provisional application No. 60/172,910, filed on Dec. 21, 1999, provisional application No. 60/172,905, filed on Dec. 21, 1999, provisional application No. 60/211,010, filed on Jun. 12, 2000.

(51) Int. Cl.
*H04L 12/28* (2006.01)
*H04J 3/16* (2006.01)

(52) U.S. Cl. ............... 370/401; 370/465; 370/411; 370/468

(58) Field of Classification Search ........ 370/229–235, 370/236, 237–238, 400–401, 411–414, 416, 370/418–419, 421, 428–429, 465, 468–469
See application file for complete search history.

(56) References Cited

U.S. PATENT DOCUMENTS

| | | | | |
|---|---|---|---|---|
| 4,245,343 A | | 1/1981 | Frey ............................ | 709/250 |
| 5,768,525 A | * | 6/1998 | Kralowetz et al. .......... | 709/228 |
| 5,953,507 A | | 9/1999 | Cheung et al. ................ | 714/4 |
| 6,005,843 A | * | 12/1999 | Kamiya .................... | 370/236.1 |
| 6,011,776 A | * | 1/2000 | Berthaud et al. ........... | 370/232 |
| 6,023,456 A | * | 2/2000 | Chapman et al. ........... | 370/252 |
| 6,046,980 A | | 4/2000 | Packer ....................... | 370/230 |
| 6,345,039 B1 | * | 2/2002 | Ito .............................. | 370/232 |
| 6,542,466 B1 | * | 4/2003 | Pashtan et al. ............. | 370/235 |
| 6,549,514 B1 | * | 4/2003 | Kilkki et al. ................ | 370/231 |
| 6,567,857 B1 | * | 5/2003 | Gupta et al. ................. | 709/238 |
| 6,598,034 B1 | * | 7/2003 | Kloth .......................... | 706/47 |
| 6,608,816 B1 | * | 8/2003 | Nichols ....................... | 370/235 |
| 6,633,540 B1 | * | 10/2003 | Raisanen et al. ......... | 370/230.1 |
| 6,658,463 B1 | * | 12/2003 | Dillon et al. ................ | 709/219 |
| 6,684,329 B1 | * | 1/2004 | Epstein et al. ................ | 713/15 |

(Continued)

OTHER PUBLICATIONS

PacketShaper brochure; www.packeteer.com/products/packetshaper/index.cfm, May 30, 2000.

(Continued)

*Primary Examiner*—Doris H. To
*Assistant Examiner*—Saba Tsegaye
(74) *Attorney, Agent, or Firm*—Fish & Richardson P.C.

(57) ABSTRACT

A communication device integrates traffic monitoring, policy configuration and enforcement, and proxy services within the device. The policies can affect both prioritization of data as well as allocation of communication bandwidth. Data packets that are accepted at the device are classified according to a set of defined classes and are transmitted through the device according to a policy for prioritization and bandwidth allocation for the classes. Optionally, some of the packets are passed to a proxy application hosted in the communication device. The device functions as a link-layer bridge, thereby allowing the device to be inserted into a data path without reconfiguring network layer software at devices that use that data path. The device includes operating modes in which packets are passed through the device without modification.

34 Claims, 9 Drawing Sheets

U.S. PATENT DOCUMENTS

| | | |
|---|---|---|
| 6,738,803 B1 * | 5/2004 | Dodrill et al. ............... 709/218 |
| 6,798,743 B1 * | 9/2004 | Ma et al. .................... 370/235 |
| 6,859,438 B1 * | 2/2005 | Haddock et al. ............ 370/235 |

OTHER PUBLICATIONS

Access Point 450, Lucent Technologies, Nov. 1999.

Web Cache Protocol, Appendix C, Sep. 16, 1998.

Akkiraju et al., Enabling Enterprise Multihoming with Cisco IOS Network Address Translation (NAT), 1997.

Quality of Service (QoS) Networking, Internet Technology Overview, Jun. 1999.

Floyd et al., Link-sharing and Resource Management Models for Packet Networks, IEEE/ACM Transactions on Networking, vol. 3, No. 4, Aug. 1995.

Braun, Tortsen, "IpnG: Neue Dienste und virtuelle Netze: Protokolle, Programmierung und Internetworking" Mar. 1999, Dpunkt, Verlag fur Digitale Technologie, Ringstrasse 19, D-69115 Heidelberg, p. 152.

Blake et al., "RFC 2475" Online Dec. 1998.

* cited by examiner

INTEGRATED ACCESS POINT NETWORK DEVICE

CROSS-REFERENCE TO RELATED APPLICATIONS

This application claims the benefit of U.S. Provisional Applications No. 60/172,910 filed Dec. 21, 1999, No. 60/172,905 filed Dec. 21, 1999, and No. 60/211,010 filed Jun. 12, 2000. These applications are incorporated herein by reference.

BACKGROUND

This invention relates to policy-based data communication over a communication link.

Referring to FIG. 1, in typical configurations in which a wide area network (WAN) 110, such as the Internet, couples a number of geographically separated site 150, each site is coupled to WAN 110 over a limited capacity data link 122. For example, data links 122 that are limited to 1.5 Mb/s (T1 rate) are common. Some sites 150, may be configured with a relatively higher capacity data link, for example if that site is the location of server computers or other resources that are accessed by client computers from many locations. At each site, a router 120 provides access to data link 122 and provides a high-speed data link 124 to a local area network (LAN) 130 to which a number of computers 140 are coupled over high-speed links 142. A typical LAN 130 operates at 10 Mb/s or 100 Mb/s. In general, computers 140 can supply data to router 120 at a higher rate than can be supported by data link 122 coupling router 120 to WAN 110, resulting in congestion at router 120. Router 120 queues the outbound data, and if it exceeds its capacity for queuing data it will discard data. Some transport layer protocols, such as TCP/IP provide a mechanism for congestion control by which each session is limited in the amount of un-acknowledged data a computer is permitted to send on a communication session.

One approach to mitigating the effects of congestion is to assign priorities to different classes of data packets that pass through router 120 over data link 122, and to provide preferential service to higher priority packets. For example, packets that are part of an interactive application may be assigned a higher priority than packets that are part of a bulk file transfer between sites. A particular approach to prioritization involves categorizing and queuing packets as they arrive at router 120 from the LAN side. Each flow is assigned a different queue. Queues are serviced according to their priority, and flows of the same priority are give a fair share of the available capacity on data link 122. A detailed discussion of such prioritization approaches can be found in "Quality of Service Networking", *Internetworking Technologies Handbook* (2nd ed), Ch. 46, Cisco Systems 1998.

Sites often host proxy applications that provide a link between client applications executing on computers at a site and server applications executing at other sites. One type of proxy application is an HTTP proxy. "Web" client applications communicate with the proxy application, which in turn makes requests to web server applications on the behalf of the client applications. From the point of view of the server applications, the communication originates from the proxy application rather than the client applications. HTTP proxy servers can provide additional services such as caching frequently-requested data so that client requests may be fulfilled using cached data rather than having to communicate over the WAN.

SUMMARY

In a general aspect, the invention is a device integrates traffic monitoring, policy configuration and enforcement, and proxy services within the device. The policies can affect both prioritization of data as well as allocation of communication bandwidth.

In a first aspect, in general, the invention is a method for processing communication. The communication is processed in a communication device that has a first interface and a second interface. Data packets are accepted at the first interface. For each accepted packet, one of a number of classes of data flows is identified as being associated with that packet. At least some of the accepted packets are queued according to the identified class. The accepted packets are then transmitted from the second communication interface according a policy for priority and bandwidth allocation associated with the classes of data flows.

The invention can include one or more of the following features.

Identifying the class of data flows includes examining network layer addressing data in the accepted packet.

Examining network layer addressing data includes identifying destination network layer addresses of the packets.

Identifying the class of data flows includes examining application layer data in the packets.

At least some of the accepted packets are passed to a proxy application hosted in the communication device.

The destination network layer addresses for the accepted packets that are passed to the proxy application are addresses of devices other than the communication device and that are accessible through the second interface. In this way, packets are intercepted by the communication device without necessarily being addressed to the communication device by the originators of the packets.

Information in the packets passed to the proxy application is transmitted from the second interface in packets with source network layer addresses associated with the communication device.

Information in the packets passed to the proxy application is transmitted from the second interface in packets with source network layer addresses equal to the source network layer addresses of corresponding accepted packets.

For the packets that are passed to the proxy application, records associated with the accepted packets are queued. Packets are transmitted from the proxy application according to the queued records.

The communication device communicates with devices over the first interface and the second interface as a link-layer bridge.

The accepted packets are transmitted without modification of their source and destination network layer addresses.

A specification of the policy is accepted using a graphical user interface.

Data related to the utilization of bandwidth allocated to the classes of data flows is displayed on the graphical user interface.

The device is operated in a second mode in which packets are passed between the first interface and the second interface without modification.

Operating in the second mode further includes monitoring the packets passing between the first interface and the second interface.

Monitoring the packets includes identifying a class of data flows associated with each packet.

The device is operated in a third mode in which the first interface and the second interface are directly connected.

The device switches to the third mode in the event of a fault at the communication device.

In another aspect, in general, the invention is a communication device. The device includes a number of network interfaces, including a first network interface, and a second network interface. The communication device is configured to pass packets belonging to a plurality of classes of data flows between the network interfaces according to a programmable policy. The device includes a number of queues, each associated with a different one of the classes of data flows. These queues are used to accept packets from the first network interface. The device also includes configuration data, which includes a configurable policy for the classes of data flows. The configurable policy for a flow includes a bandwidth parameter and a priority parameter. The device also includes a scheduler for determining when to dequeue data packets queued in the queues. The scheduler is configured according to the bandwidth parameters and the priority parameters for the classes of data flows.

The invention can include one or more of the following features.

The device includes the capability to function as a data link layer bridge when passing data packets between the network interfaces.

A proxy application for processing data accepted at the first interface is included in the device.

The device further includes a cache for servicing requests in data processed by the proxy application.

The device includes a bypass switch for coupling the first interface to the second interface in a second operating mode.

The bypass switch includes a hub for coupling the first interface to both the second interface and to a processor of the communication device. In this way, data passing between the first interface and the second interface can be monitored by the communication device without modifying the communication.

The invention includes one or more of the following advantages.

Integrating bandwidth management and prioritization in a single device can simplify administration of the device.

By acting as a data link layer bridge, a device that functions according to the invention can be inserted into a data path without reconfiguring network and higher layer software at devices that use the data path.

Proxy applications hosted in the communicate device can intercept ("hijack") communication without it being explicitly addressed to the device. Therefore, client applications do not have to be specifically configured to make use of the proxy applications.

Additional aspect, features and advantages are apparent from the following description, and from the claims.

DESCRIPTION

Figure 1:
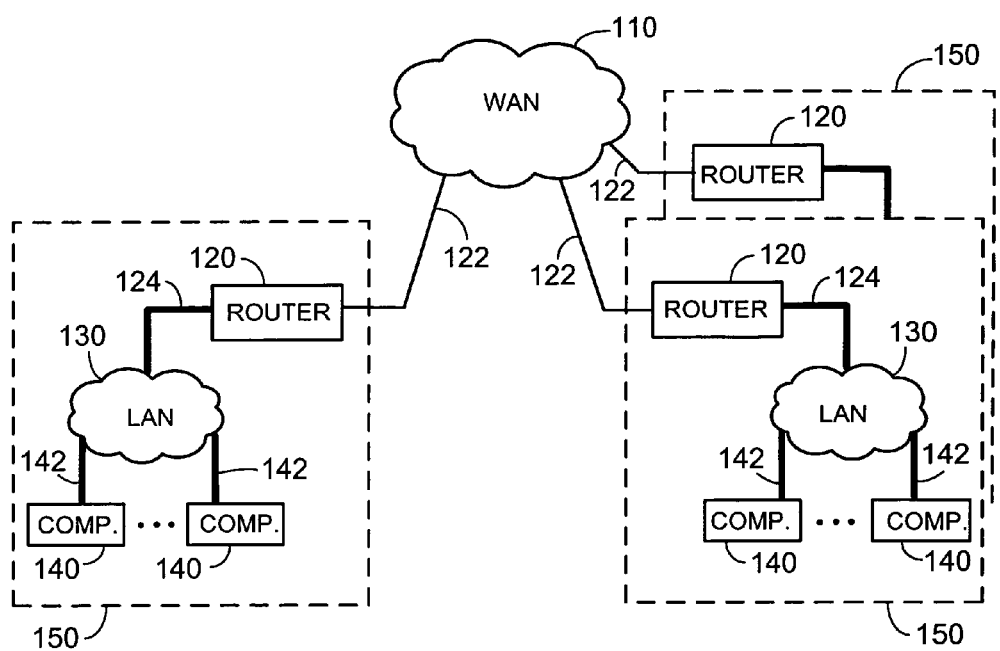
FIG. 1 is a block diagram that illustrates a number of sites coupled over a wide area network.
Figure 2:
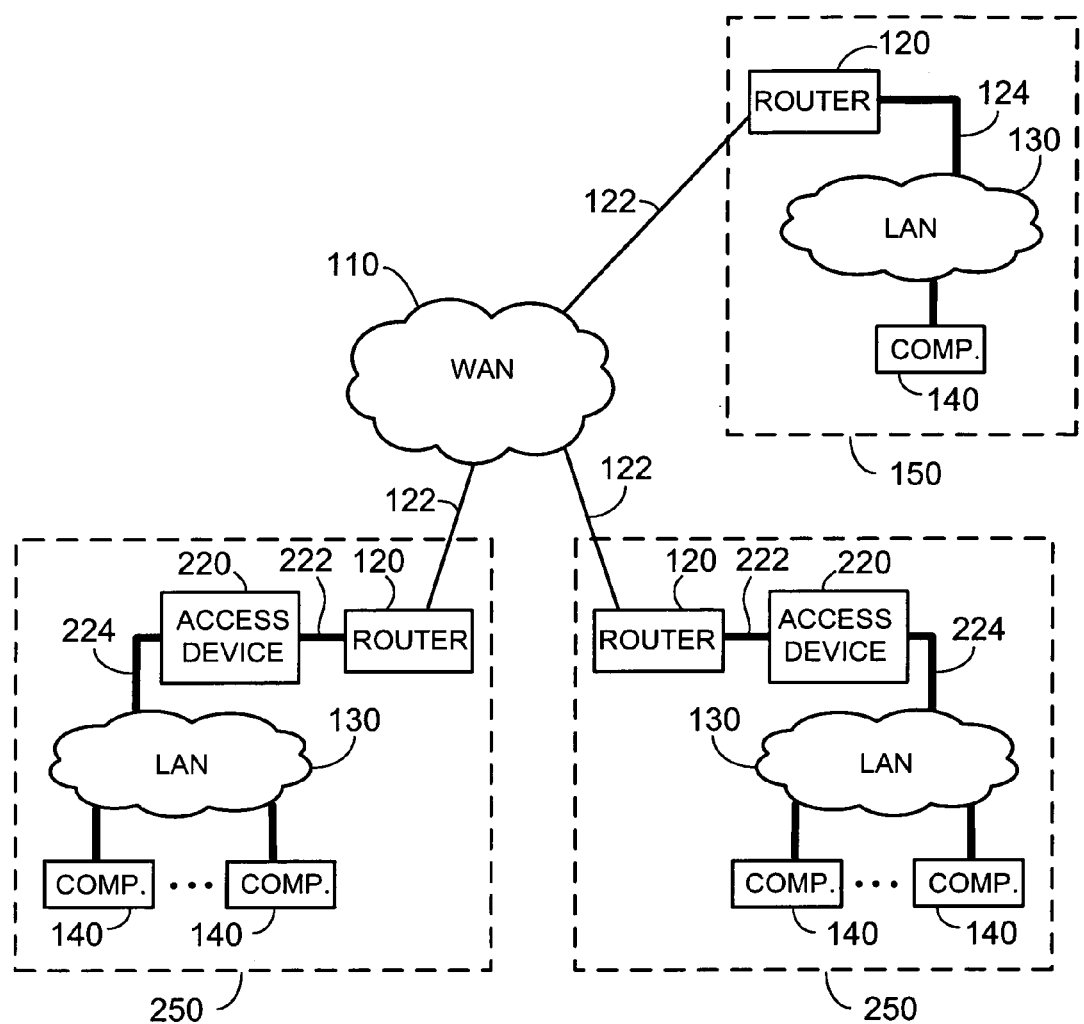
FIG. 2 is a block diagram that illustrates a number of sites coupled over a wide area network according to the present invention.

Referring to FIG. 2, a wide area network (WAN) 110 couples a number of sites 250, which are configured according to the present invention to each include an access device 220. Such access devices are applicable to a wide variety of types of WANs. WAN 110 can be, for example, a network such as the public Internet. WAN 110 can also be a private data network serving multiple distributed sites. Such a private network can be, for example, based on frame-relay or virtual network techniques. Also, although described below in the context of an Internet Protocol (IP) based WAN, the invention is also applicable to other network protocols.

Access device 220 is coupled on the data path of data leaving or arriving at the site. In this embodiment the access device is connected between router 120 and LAN 130. Access device 220 is a device that monitors traffic flowing through it, implements a user interface for setting configurable policies based on the characteristics of the monitored traffic, and enforces the configured policies. This embodiment of the access device is referred to as an "appliance" to reflect its ease of installation and configuration. For instance, as is discussed further below, other computers and networking devices do not necessarily have to be reconfigured when access device 220 is introduced at a site 250.

In general, the policies that are enforced by access device 220 relate to allocation and use of communication resources related to communication passing between LAN 130 and WAN 110. In particular, the communication resources include those related to data link 122 coupling LAN 130 with WAN 110, and may also include resources related links or points of congestion within WAN 110 itself. Access device 220 implements policies related to communication with a number of other sites across WAN 110. Some sites, such as site 150, do not include an access device, while other sites 250 do include an access device 220. In situations in which two sites 250 are each configured with an access device 220, those access devices can work together to pass data according to communication protocols that are tailored to the limited capacity data links joining the sites. It should be understood that although data links 122, which couple sites 150 and 250 to WAN 110, may be the limiting communication resources, the invention is also applicable to situations in which a communication resource within WAN 110 limits data rates between the sites. For example, in a situation in which the sites are coupled by a frame relay system, the communication rate between sites may be limited by the leased data rate within the WAN. Also, in alternative embodiments, access device 220 may be introduced at other points on paths coupling the sites, for example at the periphery of WAN 110, or at locations within WAN 110.

At each site 250, which is configured with an access device 220, the access device is coupled to router 120 over a high-speed data link 222, such as a 10 MB/s or 100 Mb/s Ethernet link, while the router is coupled to WAN 110 over a substantially slower rate data link 122. Access device 220 is also coupled to one or more computers 140 over a high-speed data link 224 and LAN 130. For example, LAN 130 includes a hub coupling computers 140 and access device 220, or may include a number of sub-networks coupled by routers. Access device 220 has the capability to pass data from LAN 130 to router 120 at rates greater than those which can be passed out over data link 122, which would result in outbound congestion at router 120, but is configurable to avoid such congestion by limiting the rate data is sent from it to router 120 over data link 222.

Figure 3:
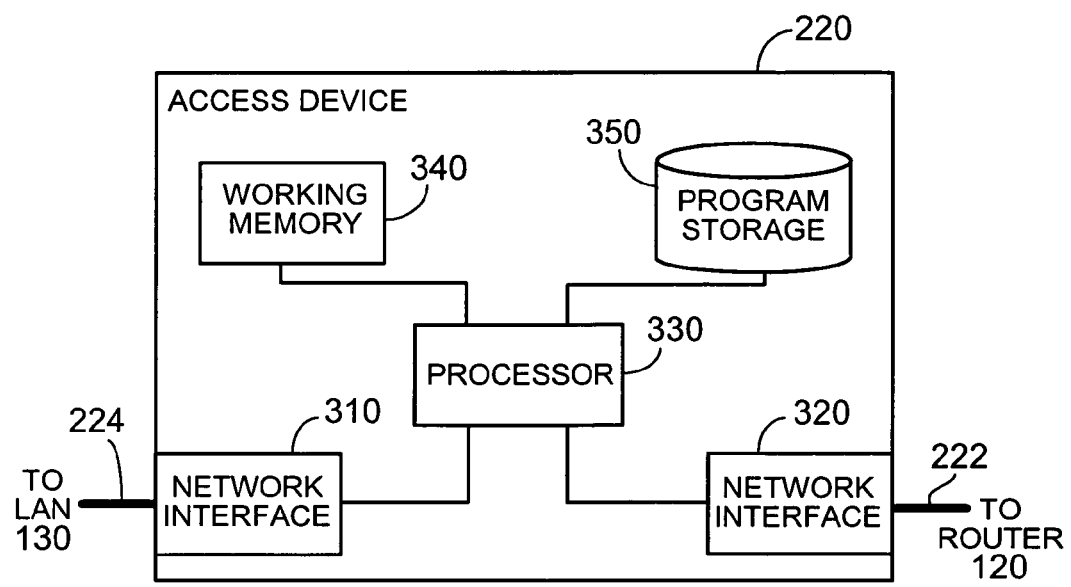
FIG. 3 is a block diagram that illustrates components of an access device.

Access device 220 also implements policies that relate to inbound data that arrives at site 250 over data link 122 and router 120. These policies are designed to affect the rates at which different inbound data streams are sent from their respective source computers, thereby reducing congestion within WAN 110 caused by the limited capacity of data link 122 for the destination site. For instance, one approach implemented by access device 220 is to use flow control provisions at the transport layer to limit the amount of data the source computers send to through the device. Referring to FIG. 3, access device 220 is implemented using a general-purpose computer, which executes a variant of the UNIX operating system. The computer includes a processor 330 coupled to a network interface 310, which provides a link to LAN 130, and a network interface 320, which provides a link to router 120. The access device also includes a program storage 350 for holding software which when executed implements various functional elements that are described below, and working memory 340, which is used to hold temporary data, such as communication packets passing though the access device. Each network interface 310 and 320 has a different media access controller (MAC) address, which allows devices connected to it to address it at the data link communication layer. In alternative embodiments, not all the functional elements are implemented in software, and other circuitry may additionally be used to process data packets as they pass through the access device.

Referring back to FIG. 2, access device 220 functions as a bridge from the point of view of LAN 130 and router 120. That is, unlike a router, which has a network layer address for each of its ports, access device 220 does not necessarily have a network address (e.g., an IP address) that is "visible" to computers 140 that pass data through it to WAN 110. Since access device 220 acts as a bridge, when it is inserted in the path between router 120 and LAN 130, network layer software does not have to be reconfigured at computers 140 or in routers in LAN 130 in order to have the access device pass data between router 120 and LAN 130.

In this embodiment, the data link layer uses the Ethernet protocol, and the Internet Protocol (IP) at the network layer. As an Ethernet bridge, access device 220 passes Ethernet packets between its network interfaces in much the same manner that a traditional bridge would do so. In particular, when access device 220 receives over data link 224 an Ethernet packet addressed to the MAC address of router 120, it processes that packet for transmission over data link 222 to the router. Similarly, when it receives an Ethernet packet on data link 222 addressed to a device accessible over data link 224, it processes that packet. Access device 220 supports standard bridge protocols that allow devices, such as hubs, in LAN 130 learn the MAC address of router 120. Note that if additional computers were coupled between access device 220 and router 120, for example, using a hub between the access device and the router, access device 220 would not process Ethernet packets passing from router 120 to those computers.

In alternative embodiments, additional network layer protocols may be supported on LAN 130 and passed between sites over WAN 110. WAN 110 may support various network layer protocols directly, for example by providing fixed data connections between particular sites. If WAN 110 is an IP-based network, such as the Internet, router 120 may encapsulate traffic that uses the additional network layer protocols in IP packets for transmission over WAN 110.

For certain operations, such as configuration and maintenance or when functioning as a cache server, access device also functions as a separate computer with its own IP address it uses in communicating with computers 140 at that site, or with other computers over WAN 110.

Figure 4:
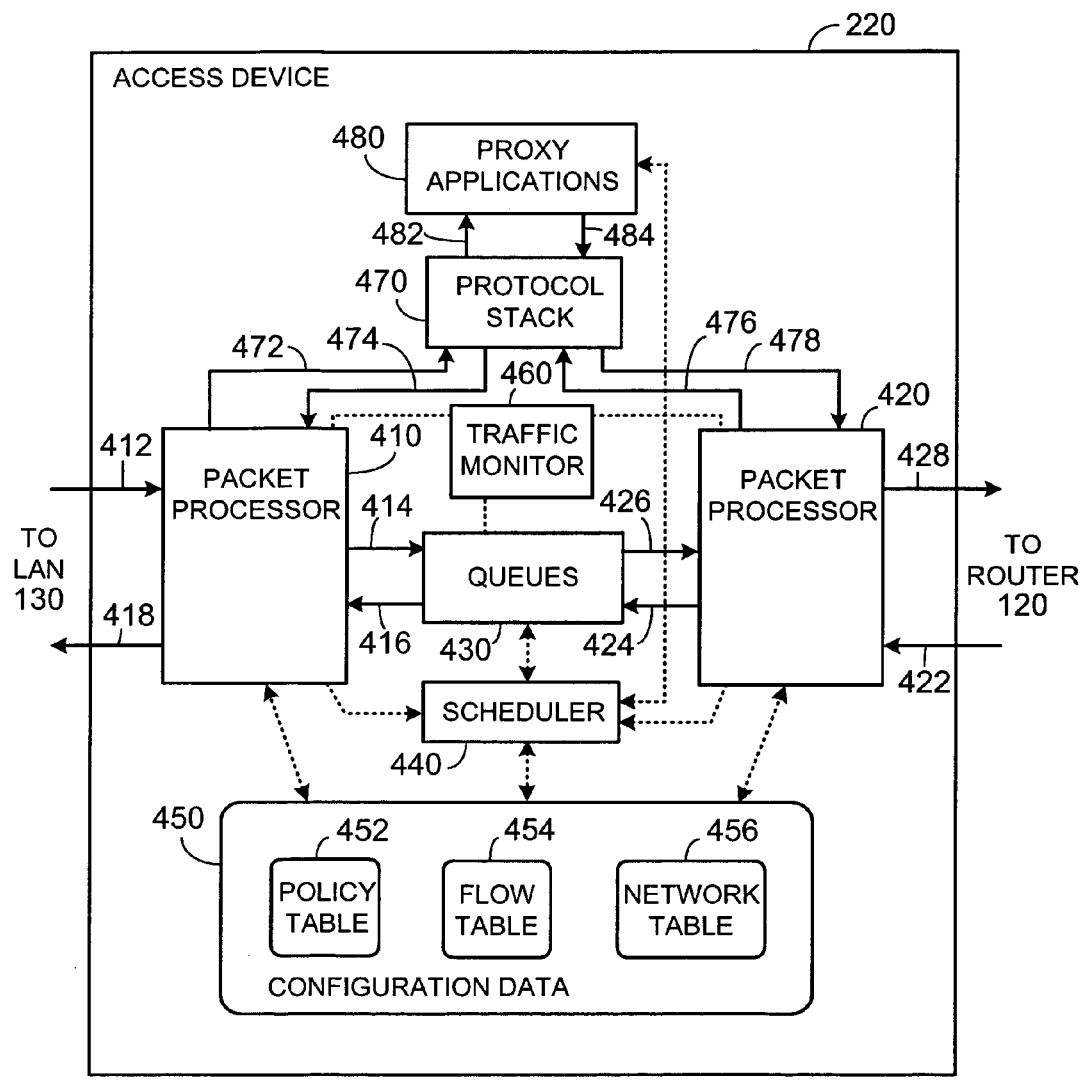
FIG. 4 is a block diagram that illustrates logical elements of an access device.

Referring to FIG. 4, access device 220 includes a number of logical elements, which are implemented by software executed on the general-purpose computer that hosts the access device. Data passes through the elements of the access device to provide communication between LAN 130 and router 120. Data from LAN 130 to router 120 enters on a data path 412 and exits on a data path 428, while data from router 120 to LAN 130 enters on a data path 422 and exits on a data path 418. Internally, access device 220 can be configure to operate in a variety of operating modes, and to pass data through alternative data paths between its elements.

In a first operating mode, access device 220 simply monitors traffic that passes between LAN 130 and router 120. This operating mode may be used, for example, when the access device is first introduced on the data link coupling router 120 and LAN 130. Data from LAN 130 is received over data path 412 by a packet processor 410. Packet processor 410 examines the content of a packet it receives over data connection 412. If the packet is addressed to the MAC address of router 120, packet processor 410 passes the packet through queues 430 to packet processor 420, which then passes the packet to router 120 over data path 428. If the packet is not addressed to router 120, the packet is discarded. A traffic monitor 460 records the characteristics of the data packet, such as its source and destination addresses, protocol used, and the number of bytes in the packet. This information is collected to produce a summary of the nature of traffic flowing through the access device, for example, summarizing cumulative byte and packet counts flowing between particular source and destination addresses or using particular protocols. This information is used to present to an operator of the device, in part, to aid the operator in further configuration of the device. In this monitoring mode, data packets flowing from data path 422 through queues 430 and out on data path 418 are also monitored.

In a second operating mode, access device 220 performs additional processing on packets that flow between router 120 and LAN 130 rather than simply passing them through. This additional processing is typically used in addition to the monitoring of the first operating mode, and may also be used independently. In the second operating mode, packet processors 410 and 420 make use of configuration data 450 to determine how to process packets that arrive at the access device. Considering a packet that arrives on data path 412 from LAN 130, packet processor 410 identifies an appropriate destination for the packet, which can be queues 430 or protocol stack 470. Processing of packets using protocol stack 470 and proxy applications 480 is described further below. When packet processor 410 passes the packet to queues 430, it identifies a particular one of a number of outbound queues in which to enqueue the packet. A scheduler 440 monitors the packets waiting in queues 430 and determines when they should be transmitted to router 120. Scheduler 440 makes use of configuration data 450 to determine which packets waiting in queues 430 to dequeue to packet processor 420 for transmission to router 120. In general, scheduler 440 dequeues packets from queues 430 only as fast as it is authorized to dequeue packets, and no faster than they can be processed by router 120 and subsequent data links thereby avoiding congestion at the router.

In general, scheduler 440 controls each direction of data flows relatively independently. Note however, that since transport layer protocols, such as TCP, make use of acknowledgment packets flowing in the reverse direction than the data-bearing packets, packet processors 410 and 420 each perform functions related to both directions of data flows.

Access device 220 processes packets passing from router 120 to LAN 130 in a similar manner. Packets pass through packet processor 420 to queues 430. Scheduler 440 dequeues the packets to packet processor 410, which passes the packets to LAN 130. Although access device 220 is coupled to LAN 130 over a high-speed data link, scheduler 440 dequeues inbound packets from queues 430 at that data rates allocated to the various inbound flows. Access device 220 controls the amount of data that source computers send without acknowledgment by adjusting a transport-layer flow control window size in a technique known as "rate shaping." By explicitly controlling the window size for particular flows, access device 220 is able to fairly allocate the window size among different flows in a particular class, for example, by maintaining an equal window size for all flows in a particular class. Also, by throttling the individual inbound flows according to the configured policies, end-to-end flow control mechanisms may also reduce the rates at which data is sent on flows that are exceeding their allocated bandwidth.

Configuration data 450 includes a policy table 452, which holds data that describes the various policies by which scheduler 440, packet processors 410 and 420, and other elements of access device 220 operate. For each particular data flow, configuration data 450 includes an entry in a flow table 454. Packet processors 410 and 420 use the flow table to route packets of outgoing data flows. Configuration data 450 also includes a network table 456, which holds data used in processing involving proxy applications 480.

Data flows passing though access device 220 are characterized by the access device according to some or all of their network, transport, and application layer protocols, and by their source and destination. The source and destination of a data flow for IP-based data flows includes both a host address and a port number. Therefore, IP-based flows are characterized by five quantities: source host address, source port, transport protocol, destination host address, and destination port, and may be characterized further by the application layer protocol and application layer data, such as data that identifies requested information.

Policy table 452 specifies how different classes of inbound or outbound flows are to be processed. Policy table 452 includes a number of records, each of which identifies a class of flows and conditions when the policy should be applied and a set of attributes or actions that are associated with the class of flows as a whole, or to individual flows in that class. A particular policy may have a number of different attributes. The policy may identify times during which is should be applied, such as "Tuesdays from 2:00 to 4:00." A policy may also be applicable only to a particular class of data flows. A class may be identified by the direction of its flows, inbound or outbound. A class of IP-based flows may be identified by constraints on the five quantities that characterize the flows. For example, class of flows may be specified by destination host address, a destination port that is a well-known port number for an application, a transport protocol, such as UDP or TCP, or any combination of characteristics. Classes of flows may also be specified by application layer protocols used, such as FTP or HTTP, and may additionally be specified by payload data that is transported at that application layer, for example by a URL that is transported in an HTTP payload. As described below, records are added to flow table 454 as new data flows are detected. To avoid the table growing without bound, the table is aged. Entries associated with flows that have been inactive for the longest time, or which have been explicitly closed, are discarded to make room for new records.

A policy can identify a minimum bandwidth and a maximum burst bandwidth that is available to the class as a whole. The policy can also identify attributes of flows that belong to that class. The policy can identify a priority, a minimum bandwidth and maximum burst bandwidth of each flow in the class. The policy can also identify admission control characteristics for the class. For example, an admission control characteristic may specify that an additional flow for a class is only admitted if the additional and existing flows of the class consume through their minimum bandwidths a total bandwidth that is less than the maximum bandwidth for the class, or consume a total bandwidth that is less than the maximum burst bandwidth for the class and the burst bandwidth is available. A policy for a class may also identify that flows in that class should be diverted ("hijacked") to a particular proxy application of proxy applications 480 (FIG. 4) rather than being passed directly through queues 430.

Figure 5:
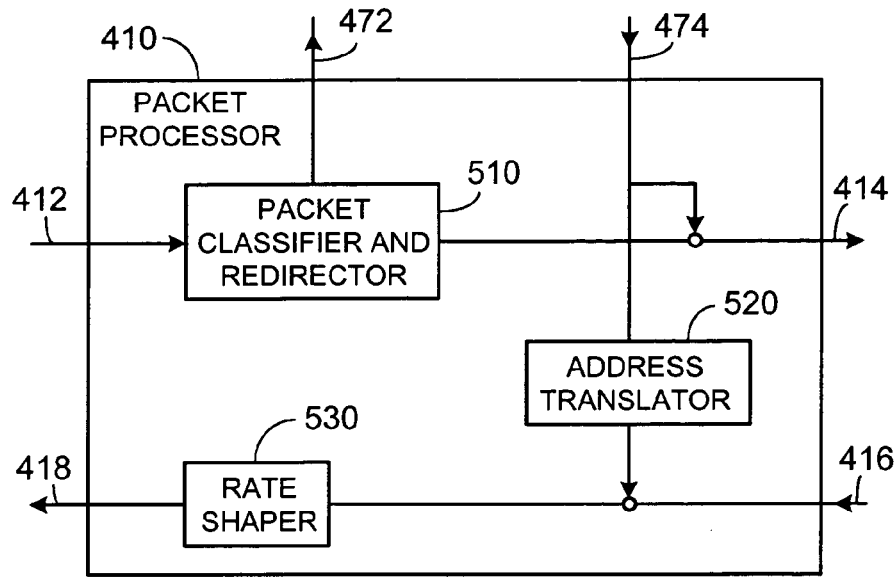
FIG. 5 is a block diagram that illustrates elements of a packet processor.
Figure 6:
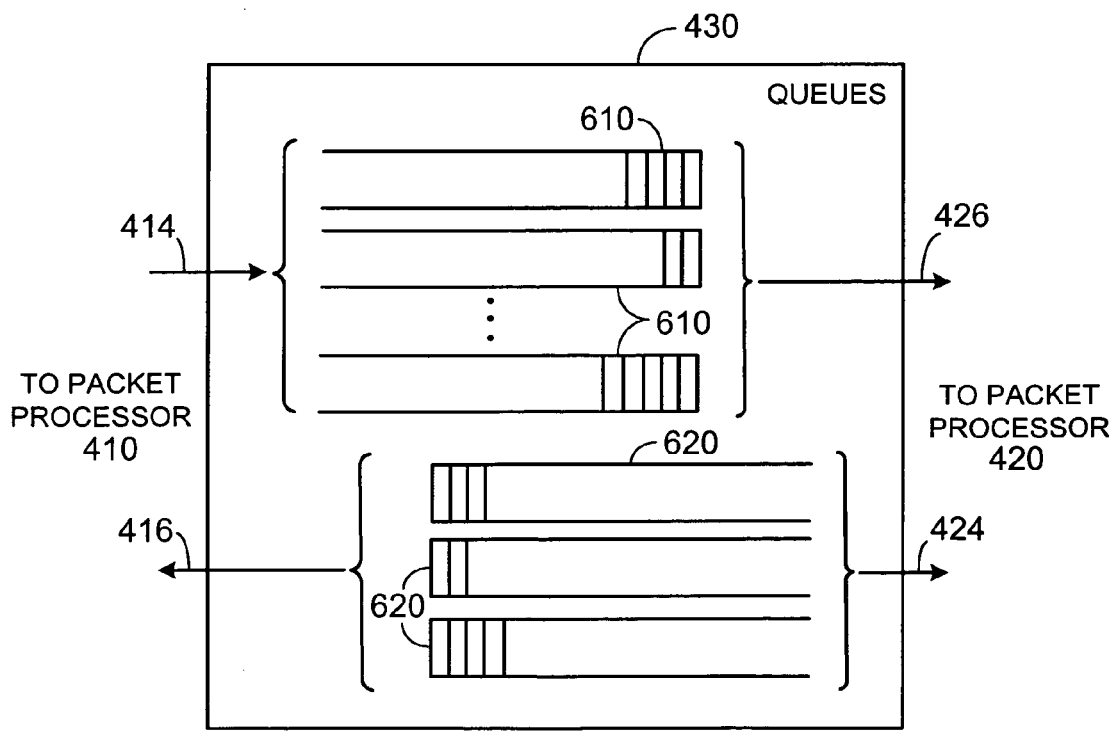
FIG. 6 is a diagram that illustrates queues that hold packets.

Referring to FIG. 5, which illustrates packet processor 410, inbound packets are first processed by a packet classifier and redirector 510. When packet classifier and redirector 510 detects a new flow of one of the classes defined in policy table 452, it creates a new entry for that specific flow in flow table 454, and that entry indicates the flows priority and bandwidth, and whether the flow is to be redirected. For flows that are not redirected, packet classifier and redirector 510 passes data packets for input data flow 412 over data flow 414 to queues 430. Referring to FIG. 6, data packets on flow 414 are accepted by queues 430 and stored in one of a number of outbound queues 610. Each outbound flow in flow table 454 is associated with a different one of outbound queues 610. Inbound data flows are handled in a like manner. Packet processor 420, which internally has the same structure as packet processor 410 (FIG. 5), passes data packets to inbound queues 620 (FIG. 6) each of which is associated with a different inbound flow.

Referring again to FIG. 5, packet processor 410 also includes a rate shaper 530 on the inbound data path. Many transport-layer protocols include end-to-end acknowledgments. In TCP, an acknowledgement includes a field that indicates to a sender the amount of data (a "window size") that it may send without acknowledgment. This field is typically used for window-based flow control. As data packets pass from a source computer 140 (FIG. 2) over data flow 412 and on to their destination, acknowledgement packets pass back through rate shaper 530. For TCP-based flows, rate shaper 530 modifies the acknowledgement packets to control the rate data is sent for those flows, thereby controlling the depth of outbound queues 610 (FIG. 6) for those flows. This mechanism is particularly useful for TCP-based flows. In TCP, when a flow is initially established, the window size may be too large and then converge slowly to a smaller value based on feedback from the destination. Using rate shaper 530, the initial window size can be set smaller thereby not having to rely on feedback from the destination to reduce the window size. Rate shaper 530 can also modify the maximum requested segment size for packets in a flow. This mechanism is used to cause a source of relatively low priority data flow to use smaller packets so that a higher priority data flow does not suffer long latency when it gets queued behind a long low-priority packet. Also shown in FIG. 5 is an address translator 520, which is used for some flows that make use of proxy applications 480 (FIG. 4). Operation of address translator 520 is described further below.

Referring back to FIG. 4, scheduler 440 implements a class-based scheduling algorithm to determine which flow should be serviced next in queues 430. In this embodiment, the scheduling algorithm follows the approach described in "Link-sharing and Resource Management Models for Packet Networks" by Floyd and Van Jacobson (IEEE/ACM Trans. on Networking, 3(4), August 1995), which is incorporated herein by reference. Scheduler 440 determines an amount of data that it can release from each queue. Scheduler 440 computes these amounts so that higher priority queues receive their minimum guaranteed bandwidth before lower priority queues, and if all the queues can receive their minimum bandwidth, then higher priority queues receive bandwidth up to the maximum bandwidth before lower priority queues.

Returning to the classification of data flows that was introduced above, there are situations in which a static specification of a destination port, for example, is not adequate to identify a server application for which it may be desirable to specify a particular policy. In some situations, an interchange between a client and server using an application layer protocol may include the server identifying a particular host address or port number to which the client should form a second related data flow. In an alternative embodiment, proxy applications 480 monitor the first application layer connection in order to intercept the identification of the host and port for the related data flow, and modify flow table 454 so that the related flow may be processed according to an appropriate policy. The FTP protocol is an example in which the port index for a related data flow is set up in a first application layer data flow. Another example in which application layer data is used to classify a flow is in an HTTP flow where a URL embedded in the flow may define the class of that flow.

Another situation in which static specification of source and destination host and port addresses may in inadequate in when server systems use a "discovery" mechanism. In such a mechanism, a client requests from a first server the address of the actual server that can provide service. An example of this type of mechanism is in a Citrix system in which a client requests and identification of an application server from a first server. The first server provides in an application layer data flow the host and port address for contacting the application server. Another example involves a client which broadcasts a request for servers of a particular type to identify themselves, and in response, one or more servers send their host address and port with which the client should communicate. Packet processor 410 detects these broadcast requests and server replies for a configured class of discovery requests, and creates flows in flow table 454 based on the responses from the servers.

As introduced above, a policy may specify that a class of inbound or outbound flows be diverted for processing by a proxy application rather than being simply passed though access device 220. Proxy processing may be used for inbound or outbound flows. The discussion initially focuses on flows that are created by a computer 140 for communication with a remote computer. Note that the computer that establishes the flow is not necessarily aware that access device 220 will perform proxy processing. This property is termed "front-end transparency." Depending on the type of proxy processing, the server computer may also be unaware that access device 220 is performing diverting the flows and performing proxy processing. This property is termed "back-end transparency."

Figure 7:
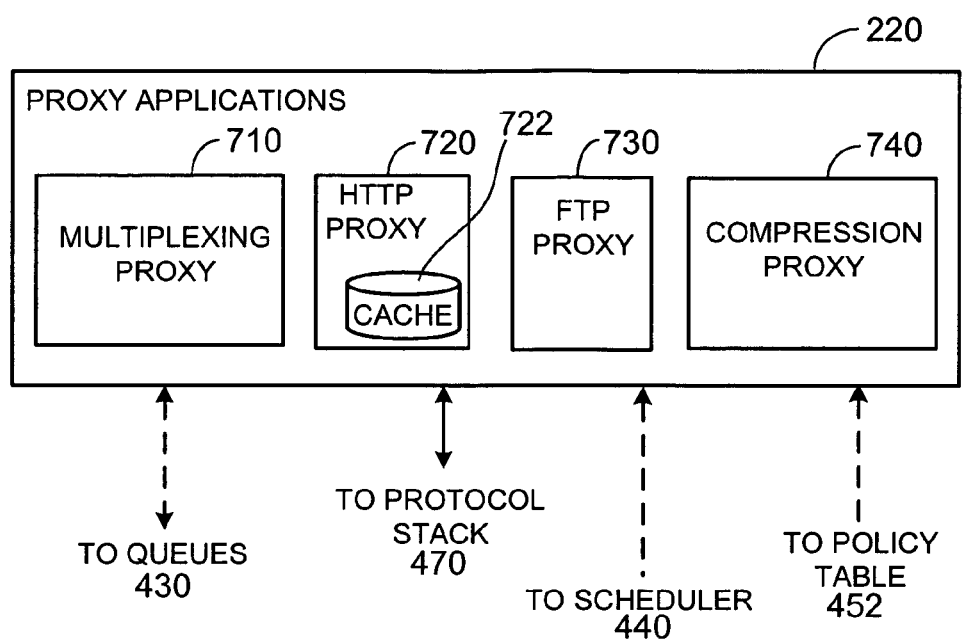
FIG. 7 is a diagram that illustrates proxy applications.

Referring to FIG. 7, proxy applications 480 performs a number of different types of proxy services. A first type of proxy service relates to multiplexing multiple data flows within a single transport layer protocol data stream coupling access device 220 and another access device 220 at another site. A multiplexing proxy 710 implements a type of multiplexing is described in U.S. Pat. No. 6,266,701, "Apparatus and method for improving throughput on a data network," which is incorporated herein by reference. Alternative embodiments use other well known approaches to multiplexing, or "tunneling," multiple data flows, for example to implement virtual private network (VPN) arrangements coupling sites 250. Note also that although described in terms of access devices 220 at different sites 250 cooperating to implement the multiplexing arrangement, a proxy application of an access device 220 may alternatively cooperate with a dedicated server at another site that is not part of a similar access device 220.

A second type of proxy service performs application layer processing. An instance of this type of service is HTTP proxy 720. HTTP proxy 720 includes a cache 722 for holding data that have been transferred to the site of the access device, thereby allowing subsequent requests from client computers at the site to be served from the cache rather than from their original server computers. Another instance is FTP proxy 730, which monitors a control channel of communication between a client and a server computer, and modifies records in flow table 454 according to data flows that are established using the control channel.

A third type of proxy modifies a data flow. Compression proxy 740 compresses the packets of a data flow for transmission over WAN 110. At a destination site, a compression proxy 740 decompresses the packets for transmission to their destination.

Referring back to FIG. 5, when packet classifier and redirector 510 receives a packet from data flow 412 from LAN 130, flow table 454 may indicate that the packet is to be directed to a specified one of proxy applications 480. If this is the case, the packet is sent over data flow 472 to protocol stack 470. Note that the source computer does not have to be reconfigured to perform the redirection. In this embodiment, protocol stack 470 is a modified version of a TCP/IP protocol stack that is standard on the UNIX-based host platform. In particular, protocol stack 470 is such that packets that are not addressed to the local host are not discarded but are rather passed up the stack to the application that is listening for data on the specified port. When a packet is redirected by packet classifier and redirector 510 to protocol stack 470, a flag is associated with the packet indicating that it is a redirected packet, and the packet is sent to a port that is associated with the proxy application that is to service the packet. The proxy application receives the packet, which indicates the original source and destination address, from protocol stack 470 and processes it.

Depending on the nature of the proxy application, the data carried by the received packet follows one of a number of paths. Consider first the path for a flow that is multiplexed by multiplexing proxy 710. Note that the connection between multiplexing proxy 710 and a corresponding multiplexing proxy 710 at another access device 220 at another site 250 makes use of a transport layer connection whose source and destination network (IP) addresses are the access devices themselves. That is, as a host for the proxy applications, access device 220 acts as a host that is bridged at a data link layer with router 120. Note that if multiple flows were multiplexed into one data stream without involvement of scheduler 440, the aggregated data stream couple be managed and subject to an overall policy, but scheduler 440 would not enforce detailed policies governing the individual flows. Therefore, when multiplexing proxy 710 receives a data packet that is to be multiplexed, it passes back to packet processor 410 a marker, or placeholder, for that packet that is queued in queues 430. Each individual flow that is to be multiplexed has a separate queue. When the marker reached the head of the queue and is dequeued by scheduler 440, packet processor 420 notifies the proxy application that the packet can now be sent, and the proxy application sends a next portion of the aggregated data stream, which includes data corresponding to the dequeued marker, over data path 478 for transmission over data path 428 to router 120. In this way, although the proxy application is responsible for the arrangement of the data in the multiplexed data stream, scheduler 440 is responsible for metering out the flows within the multiplexed data streams.

As described above, multiplexing proxy 710 is not "back-end transparent." That is, outbound data packets from multiplexing proxy 710 have a source address that corresponds to the host address of the access device and a port address that is associated with the proxy, rather than the host address of the source computers for the individual flows. Replies accepted by access device 220 from router 120 that are destined for the multiplexing proxy are directed to the proxy by packet processor 420, without needing to consult flow table 454.

Other proxy applications are "back-end transparent" so that the source address of the packets that are received at the destination is that of the source computer not the access server. This transparency makes use of address translator 520 in packet processor 420. (Note that FIG. 5 illustrates packet processor 410; address translator 520 in packet processor 420 accepts input on data path 478 and sends them through rate shaper on data path 428 to router 120.) An example of a back-end transparent proxy application is HTTP proxy 720, which functions as follows. A packet containing an HTTP request for a particular "web page" is redirected by packet processor 410 to HTTP proxy 720 according to flow table 454. Note that this redirection policy may specified as a function of the client or server addresses, or optionally, as a functions of particular web pages that are requested. HTTP proxy 720 includes a cache 722. If the requested page is already cached, and configuration data indicates that the cached data is not yet too old, then the request is handled by HTTP proxy 720 by sending a reply over data path 474 to packet processor 410. The packet has a source address that makes it appear to come from the server computer so that the client computer is not necessarily aware that the content was cached. If the page is not cached, then HTTP proxy 720 attempts to obtain the page from the server. HTTP proxy 720 sends a request to the server computer over data link 478 to packet processor 420. However, in order to achieve back-end transparency, packet processor 420 modifies the source address to appear to have come from the client computer. When the server computer replies with the data, rather than directing the packets directly to the client computer, packet processor 420 redirects them back to HTTP proxy 720, which stores the data in cache 722, and passes the data to the client computer as in the case that it already had the data in its cache. Packet processor 410 and 420 make use of network table 456 to perform this translation of source addresses. If for some reason the request from HTTP proxy 720 to a server computer results in an error, for example because the server is not responding or because the requested page is not available or as a result of a timeout, rather than sending an error message from HTTP proxy 720 to the client computer, HTTP proxy 720 passes the original request to the server computer, and a second error message is passes through the access device to the client computer without processing by the HTTP proxy 720, thereby maintaining front-end transparency. In this approach, HTTP proxy 720 does not acknowledge a request from a client computer until it has established a connection with the server, and if it fails to establish the connection, relies on the server computer sending the error message directly to the client computer. As with multiplexing proxy 710, HTTP proxy 720 uses markers that pass through queues 430 and that are dequeued by scheduler 440 according to the allocated bandwidths and priorities for the various flows. In this way, for example, HTTP access to some content may receive a higher priority or a greater bandwidth allocation than HTTP access to some other content.

In an alternative embodiment, HTTP proxy 720 is designed not to be back-end transparent. Servers receive requests with a source address of the access device. Provisions in the HTTP application layer protocol for caching are used to identify requests from the different clients.

In an alternative embodiment, rather than having cache 722 as an integrated component of HTTP proxy 720, the cache may be hosted on a different computer. The cache may then be accessed using a network file server protocol, or alternatively, the requests can be sent from the HTTP proxy to a web caching server, for example, according to the web cache control protocol (WCCP).

FTP proxy 730 handles file transfers according to the file transfer protocol, FTP. FTP makes use of a control data flow which is used by a client and a server to establish separate data flows for the actual file transfers. FTP proxy 730 intercepts the control data flow in a front-end and back-end transparent manner. However, rather than also intercepting the separate data flows for the data transfers, it detects the establishment of the separate data flows, and modifies flow table 454 to pass the data directly through queues 430 according to an appropriate policy for those data flows.

A compression proxy 740 intercepts data packets on flows redirected to it, compresses the data payload, and sends the compressed payload out in a front-end/band-end transparent manner. At the other end, a corresponding access device redirects the compressed packets to a corresponding compression proxy 740, which decompresses the packets and send them on to their destination.

In order to support efficient transfer of data through proxy applications 480, protocol stack 470 has a provision to keep the data payload of packets in the operating system kernel. In normal operation of the UNIX operating system, when a packet is passed through a protocol stack to an application, which executes in a user address space, the packet is copied from the kernel address space to that user address space. Then when the packet is sent back down the protocol stack, it is one again copied, this time from user space to kernel space. Protocol stack 470 has the provision to pass header information from kernel space to user space and back, but to keep the data payload in kernel space. This is useful for proxy applications that manipulate the header information, for instance in multiplexing data streams, without needing to manipulate the data payload.

In an alternative embodiment, a proxy application may communicate with a corresponding proxy application at another site, but rather than passing data over LAN 130 to a computer 140, another communication path is used. In one such embodiment, a proxy application is supports voice-over-IP communication. The proxy application is coupled to a voice PBX. The proxy application provides a gateway function between the PBX and WAN 110. Using the policy management features of the access device, particular telephone connections can be guaranteed a minimum bandwidth, and the class of telephone connections can be limited in its use of the available bandwidth. Admission control mechanisms in the access device can also be used to limit the number of telephone connection based on the available resources. For example, if the access device cannot accept a telephone call, it can be placed using traditional telephone switched circuits as an overflow mechanism.

As introduced above, access device 220 includes a monitoring mode in which statistics about different classes of flows are collected. Access device 220 implements a graphic user interface (GUI) that integrates monitoring, reporting, and policy specification. Using the GUI, a user, such as an administrator of the device, can monitor application traffic in the network and adjust the network behavior to enhance application performance.

Figure 8:
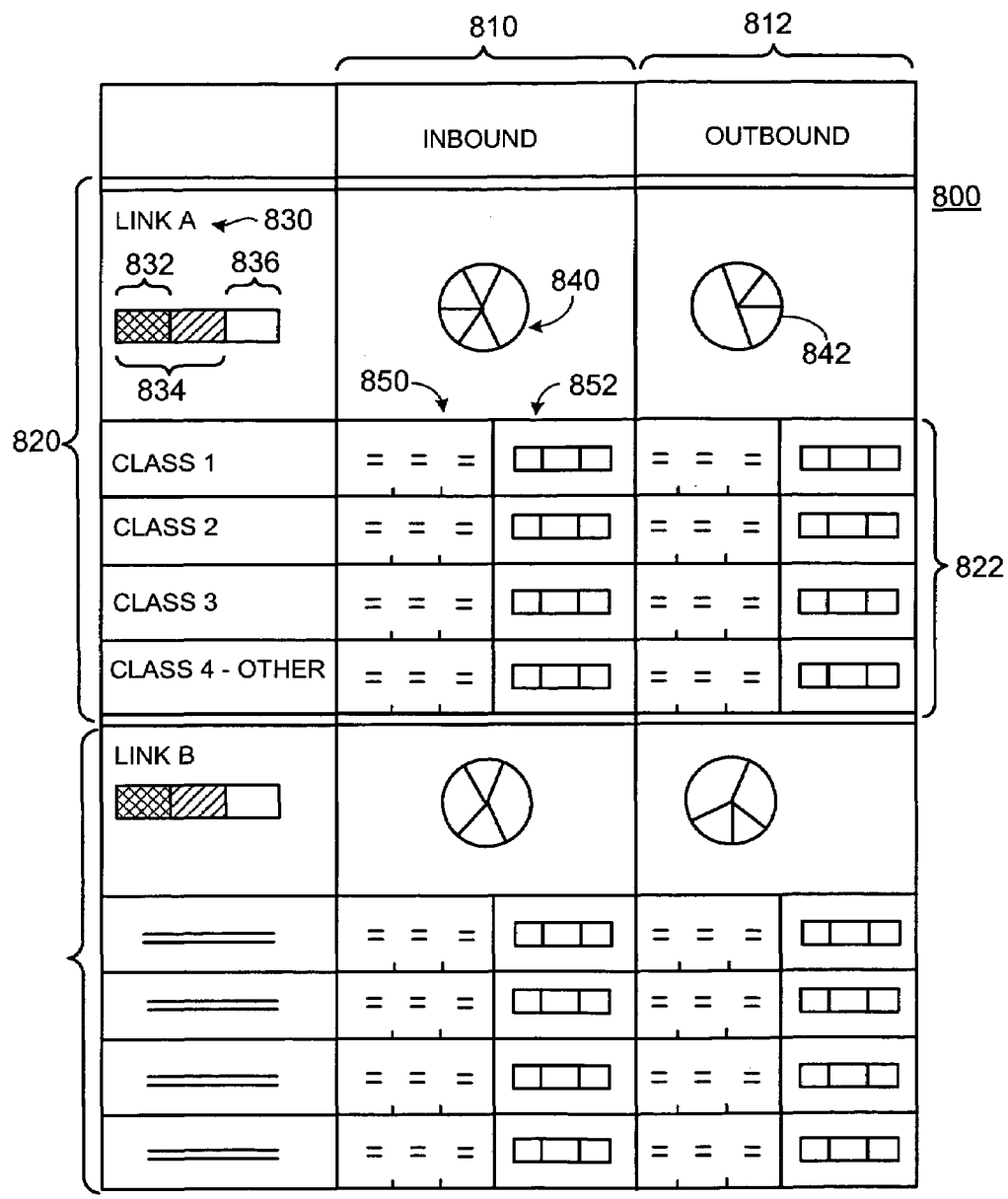
FIG. 8 is a diagram illustrating a monitoring interface screen

When the user launches GUI he is presented with a monitoring screens, illustrated in FIG. 8. The user can monitor applications by protocol (Ethernet, IP, TCP and UDP) or by IP address. The user can see the top 10 protocols that currently take up the largest percentage of the available bandwidth. From the policy configuration screen the user can add a new policy to provide traffic shaping for the particular protocol type. The user can click on any of the protocols listed on the screen. This brings up a pop-up box that allows the user to add the selected protocol to a policy.

The layout of a monitoring screen 800 is illustrated in FIG. 8. Screen 800 is divided into link sections 820, each associated with a limited capacity link. In the discussion above, access device 220 is described as scheduling traffic for a single data link 122 (FIG. 2), however, in general, an access device may be responsible for separately scheduling multiple links. For instance, an access device 220 at a server site 250 may be responsible for scheduling traffic to client sites 150 at which there is no access device. Screen 800 includes an inbound section 810 and an outbound section 812 for each link. In each link section 820, an overall utilization bar graph 830 show a first segment 832 corresponding to in-use bandwidth for the link, a second segment 834 for the allocated bandwidth, and a third segment 836 showing the excess burst bandwidth reserved on the link. In each of the inbound and outbound sections for the link, a pie graph 840 and 842, respectively, shows the relative utilization by different classes of flows, for instance by transport layer protocol. Link section 820 also includes a class-specific section 822 in which each of a number of classes includes numerical quantities 850, such as in-use, allocated, and burst bandwidth, as well as a bar chart 852 or the same format as bar chart 836 for the entire link. Flows that are not within a defined class are shown in a "other" class.

Figure 9:
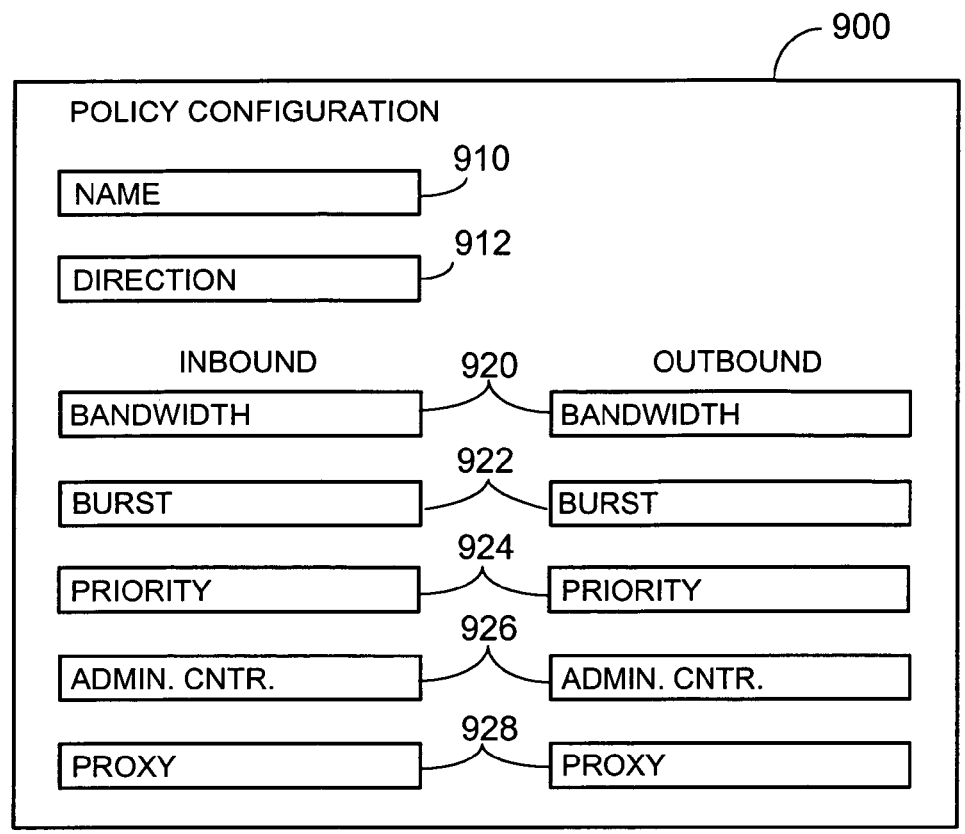
FIG. 9 is a diagram illustrating a policy configuration screen.

A user can select one of the define classes of flows, or the "other" class, in order to configure a policy for the flow, amend the definition of the class, or define additional classes, for example to partition an existing class. By selecting a class of flows on screen 800, a policy configuration screen 900 is displayed (FIG. 9). Here the user can set the name 910 and direction (inbound, outbound, or both) 912 of the flow, bandwidth requirements for the application 920, amount of bandwidth it allows to borrow (burst) 922, priority 924, per-session bandwidth and admission control (what to do with the connections that cannot be given the request amount of bandwidth) 926. The user can also set features and parameters of the proxy application 928. For example, the user can set HTTP caching to be on or off for inbound or outbound traffic. Since the device controls both traffic related features (bandwidth, priority, etc.) and proxy application related features (caching, etc.), the GUI provides a single interface for setting the characteristic of traffic and proxy application features.

In alternative embodiments, access device 220 is deployed at locations other that at the sites of client or server computers. For example, an access device 220 can be deployed at a "point of presence" (POP) of WAN 110. Similarly, access devices can be deployed within WAN 110, for example at peering locations between different portions of the WAN.

Figure 10:
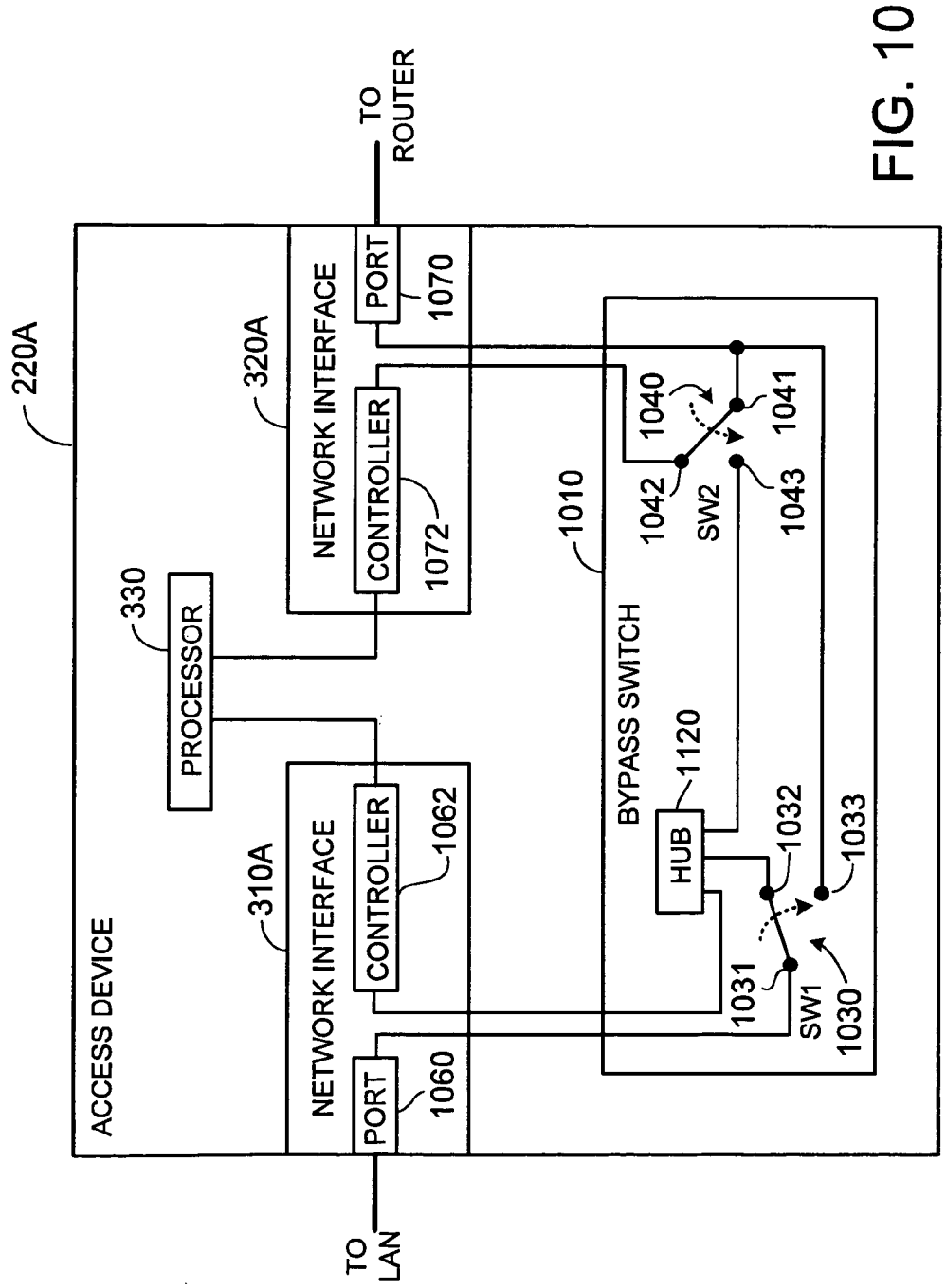
FIG. 10 is a block diagram of an access device that incorporates a bypass switch.

Referring to FIG. 10, in an alternative embodiment, an access device 220A is includes the logical elements shown in FIG. 4. In addition, access device 220A includes a bypass switch 1010 that maintains connectivity between LAN 130 and router 120 when access device 220A looses power of fails to operate correctly.

The electrical connection between a port 1060 and a controller 1062 that form network interface 310A is broken in this embodiment and the port and controller are connected to bypass switch 1010. Similarly, port 1070 and controller 1072 are connected to bypass switch 1010. In normal operation, bypass switch couples port 1060 to controller 1062 through a switch SW1 1030 and hub 1020, and couples port 1070 and controller 1072 through a switch SW2 1040.

Switch SW1 1040 is toggled depending on whether access device 220A is powered up. When the access device is powered, switch SW1 bridges terminals 1031 and 1032. Hub 1020 is also powered. Therefore, packets arriving at port 1060 are passed through to controller 1062. When the access device does not receive power, switch SW1 1030 bridges terminals 1031 and 1033. Terminal 1033 is electrically connected to port 1070. Therefore, when the access device does not receive power, ports 1060 and 1070 are electrically connected and it is as if access device 220A were removed from the circuit. Since access device 22A acts as a bridge, computers 140 and router 120 do not have to be reconfigured to maintain connectivity between them.

Switch SW2 1040 is toggled based on the software being enabled or disabled. In the enabled state, switch SW2 bridges terminals 1041 and 1042, which provides a direct electrical connection between port 1070 and controller 1072. If the software is disabled, switch SW2 bridges terminals 1041 and 1043. This connects port 1070 to hub 1020. Therefore ports 1060 and 1070 are bridged through hub 1020, and access device 220A is logically out of the circuit coupling router 120 and computers 140. In this mode in which the software is not enabled, packets flowing between ports 1060 and 1070 are also passed to controller 1062 through hub 1020. This allows access device 220A to operate in a monitoring mode in which it monitors and records statistics of data flows between the ports, but does not affect their flow in any way.

It is to be understood that the foregoing description is intended to illustrate and not to limit the scope of the invention, which is defined by the scope of the appended claims. Other embodiments are within the scope of the following claims.

What is claimed is:

1. A method for processing communication in a device operating in a first mode, the device having a first interface and a second interface, comprising:
   accepting data packets at the first interface;
   controlling a rate of arrival of the data packets at the first interface, the first interface configured to enable bi-directional communication, the controlling including sending control information from the device to at least one of a plurality of other devices to effect the rate of arrival;
   for each accepted packet, identifying one of a plurality of classes of data flows associated with said packet;
   for at least some of the accepted packets, queuing said packets according to the identified class for said packet; and
   transmitting the accepted packets through the second interface, the second interface configured to enable bi-directional communication, the transmitting and the controlling both being in accordance with a policy associated with the plurality of classes of data flows.

2. The method of claim 1 wherein identifying the class of data flows includes examining network layer addressing data in the accepted packet.

3. The method of claim 2 wherein examining the network layer addressing data includes identifying destination network layer addresses of the packets.

4. The method of claim 2 wherein identifying the class of data flows includes examining application layer data in the packets.

5. The method of claim 1 further comprising, for at least some other of the accepted packets, passing the accepted packets to a proxy application hosted in the communication device.

6. The method of claim 5 wherein at least some of the accepted packets that are passed to the proxy application each include a network layer destination address of a device other than the communication device and that is accessible through the second interface.

7. The method of claim 5 wherein information in the packets passed to the proxy application is transmitted from the second interface in packets with source network layer addresses associated with the communication device.

8. The method of claim 5 wherein information in the packets passed to the proxy application is transmitted from the second interface in packets with source network layer addresses equal to the source network layer addresses of corresponding accepted packets.

9. The method of claim 5 further comprising, for the packets that are passed to the proxy application, queuing records associated with the accepted packets, and transmitting packets from the proxy application according to the queued records.

10. The method of claim 5 wherein the proxy application performs a data multiplexing function.

11. The method of claim 5 wherein the proxy application performs a data compression function.

12. The method of claim 5 wherein the proxy application performs a voice-over-IP function.

13. The method of claim 1 wherein the communication device communicates with devices over the first interface and the second interface as a data link layer bridge.

14. The method of claim 13 wherein the accepted packets are transmitted without modification of their source and destination network layer addresses.

15. The method of claim 1 further comprising accepting a specification of the policy using a graphical user interface.

16. The method of claim 1 further comprising displaying data related to utilization of bandwidth allocated to the classes of data flows on the graphical user interface.

17. The method of claim 1 further comprising operating the communication device in a second mode, including passing packets between the first interface and the second interface without modification.

18. The method of claim 17 wherein operating in the second mode further includes monitoring the packets passing between the first interface and the second interface.

19. The method of claim 18 wherein monitoring the packets includes identifying a class of data flows associated with each packet.

20. The method of claim 1 further comprising operating the communication device in a third mode, including directly connecting the first interface to the second interface.

21. The method of claim 20 further comprising switching to the third mode of operation in the event of a fault at the communication device.

22. The method of claim 1 wherein the policy includes at least one of a priority and a bandwidth allocation for one of the classes of data flows.

23. The method of claim 22 wherein controlling the rate of arrival of packets includes controlling the rate according to the policy associated with the classes of data flows.

24. The method of claim 23 wherein controlling the rate of arrivals of packets includes rate shaping data flows associated with the accepted packets.

25. The method of claim 1, wherein the control information is sent from the device to at least one of the plurality of other devices over the first interface.

26. The method of claim 1, wherein controlling the rate of arrival of data packets comprises:
   controlling a window size of a class of data flows, the class being one of the plurality of classes.

27. The method of claim 26, wherein controlling the window size of a class of data flows comprises:
   determining a portion of the window size to be allocated to each of the data flows of the class.

28. A communication device comprising:
   a plurality of network interfaces, including a first network interface, and a second network interface, each of the first network interface and the second network interface being configured to enable bi-directional communication, wherein the communication device is configured to pass packets belonging to a plurality of classes of data flows between the network interfaces according to a configurable policy;
   a plurality of queues, each associated with a different one of the classes of data flows, for accepting packets from the first network interface;
   storage for configuration data, including storage for the configurable policy for the classes of data flows;
   a rate shaper for controlling a rate of arrival of packets at the first network interface according to the configurable policy, the controlling including sending control information from the device to at least one of a plurality of other devices to effect the rate of arrival; and
   a scheduler for determining when to dequeue data packets queued in the plurality of queues according to the configurable policy for the classes of data flows.

29. The device of claim 28 wherein the device includes the capability to functions as a data link layer bridge when passing data packets between the network interfaces.

30. The device of claim 28 further comprising a proxy application for processing data accepted at the first interface.

31. The device of claim 30 further comprising a cache for servicing requests in data processed by the proxy application.

32. The device of claim 28 further comprising a bypass switch for coupling the first interface to the second interface in a second operating mode.

33. The device of claim 32 wherein the bypass switch includes a hub for coupling the first interface to both the second interface and to a processor of the communication device, whereby data passing between the first interface and the second interface can be monitored by the communication device without modifying the communication.

34. The device of claim 28 wherein the configurable policy for a data flow includes at least one of a priority and a bandwidth allocation.

* * * * *